Jan. 20, 1959   M. J. E. GOLAY   2,870,343
RADIATION COMPARISON SYSTEMS
Filed Nov. 12, 1954   2 Sheets-Sheet 1
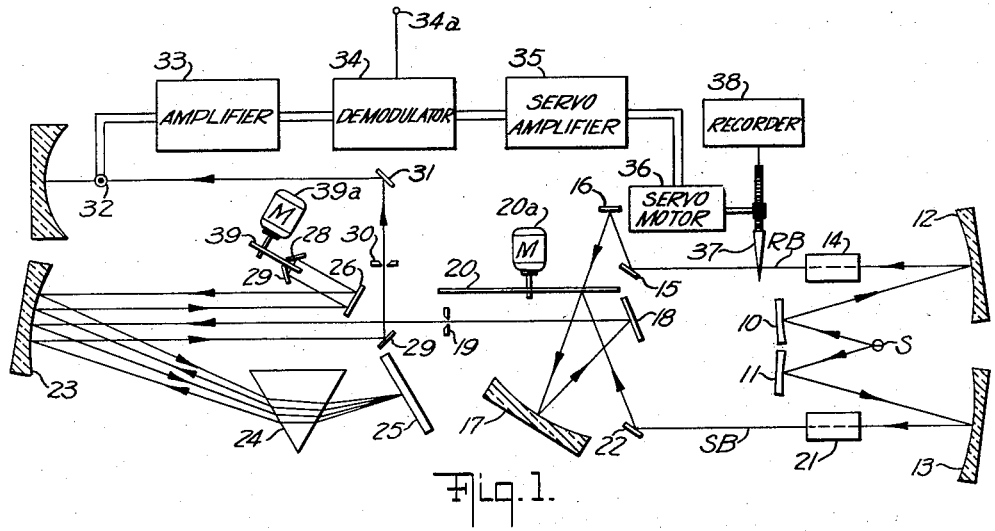
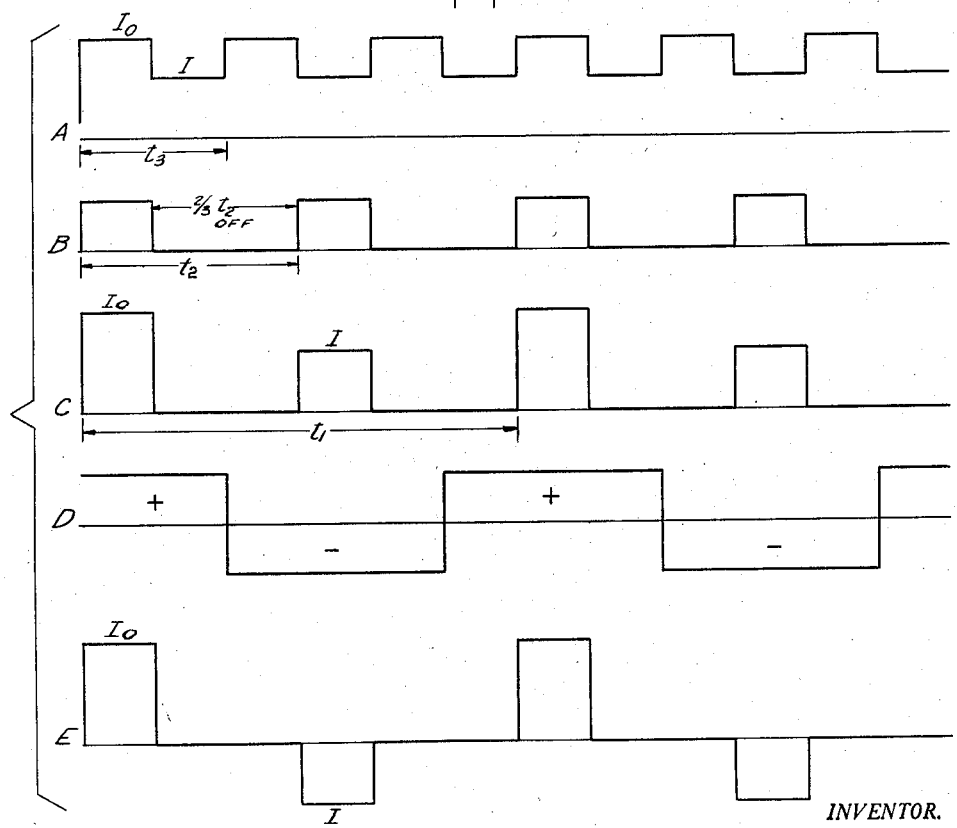
INVENTOR.
MARCEL J. E. GOLAY
BY
ATTORNEY

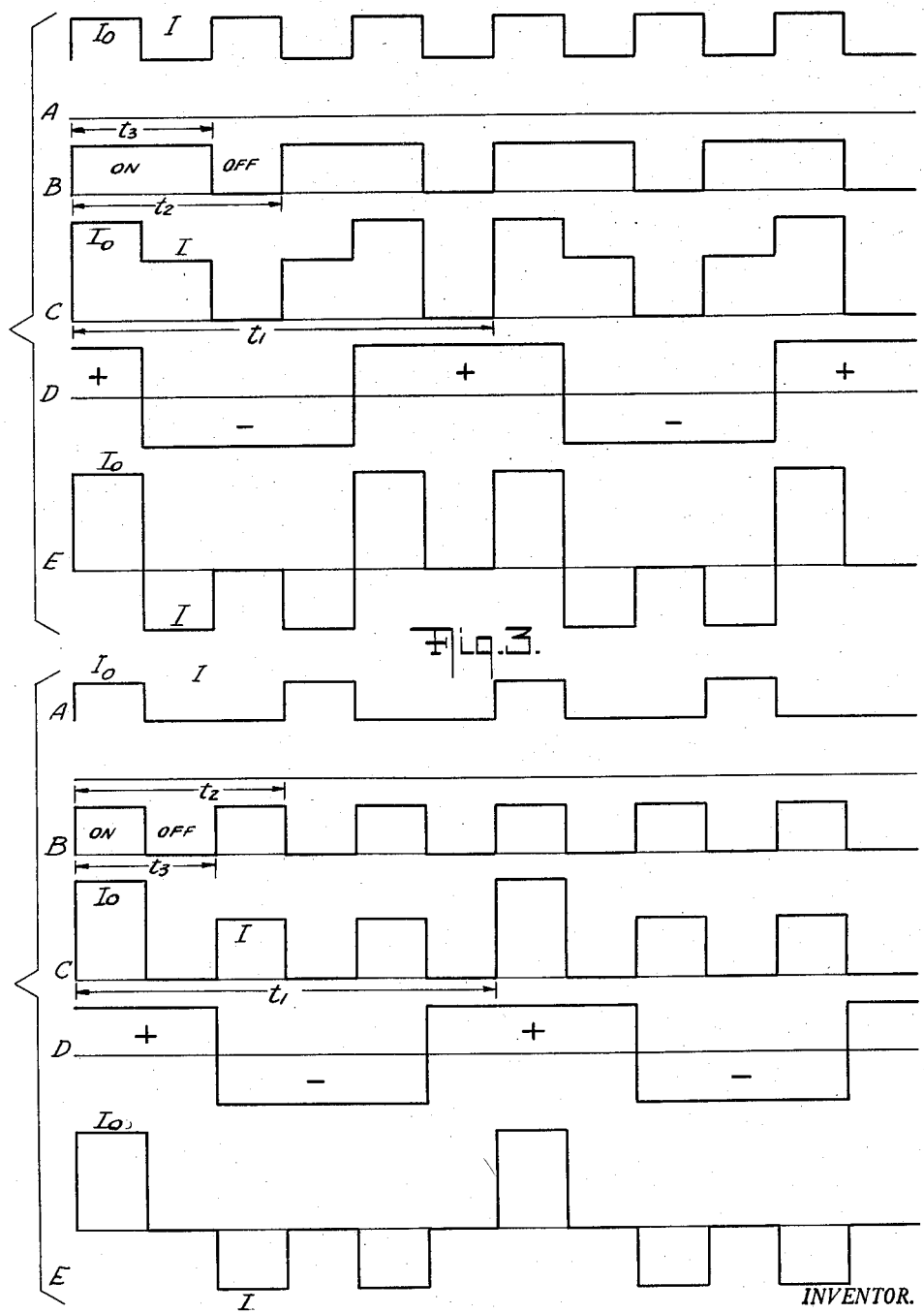

# United States Patent Office 2,870,343
Patented Jan. 20, 1959

2,870,343

RADIATION COMPARISON SYSTEMS

Marcel J. E. Golay, Rumson, N. J., assignor to The Perkin-Elmer Corporation, Norwalk, Conn., a corporation of New York Application November 12, 1954, Serial No. 468,388

7 Claims. (Cl. 250—220)

This invention relates to an improved double beam radiation comparison system and is particularly concerned with providing an optimal signal-to-noise ratio in the useful output of such a system while rejecting unwanted spurious radiation signals which constitute sources of error.

Numerous substances, materials, solutions and gases have characteristic radiation absorption spectra which not only differ from each other but are unique for each such substance so that a highly incisive clue as to its fundamental nature is afforded which, in many instances, is markedly superior to identification or classification by any other known means.

While instruments which discern such characteristic radiation spectra offer a means of deeply penetrating analyses and comparison, the amount of radiation which must be measured is so minute as to give rise to a signal-to-noise problem in the useable output of such systems. Additionally, the degree of sensitivity of such systems makes them subject to error from sources of unwanted radiations which may be collectively referred to as "stray radiation."

One object of the present invention is to produce the optimal signal-to-noise ratio of the useable output signal which is a measure of the difference in intensity between the radiation beams compared.

Another object of the invention is to reject unwanted radiation signals in the radiation comparison system while preserving the enhanced signal-to-noise ratio.

The present invention is directed to a double beam radiation comparison system in which both beams intermittently follow the same path so as to use the same dispersion means and the same radiation detector. The principal purpose of dual beams as used in an absorption comparison system is to obtain a measure of percentage absorption as a function of wavelength. In some prior art double beam systems such as that disclosed by Jamison et al. in U. S. Patent No. 2,547,212, sound engineering practice has dictated that the two beams be made to intermittently follow the same path in the system by being alternately switched at a frequency which has a favorable signal-to-noise ratio for the particular type of detector employed in the system. Such systems are made to respond only to radiation which fluctuates at the selected frequency and are thus very insensitive to any steady radiation from an outside source or any absorbing medium in the path of both beams such as atmospheric water vapor or carbon dioxide. Furthermore, this arrangement renders such systems virtually insensitive to changes in ambient temperature and non-uniformity of emission of the source of radiation.

It has been found advantageous in radiation comparison systems to disperse the intermittent beams more than once in order to improve the resolution of the measurement made. A single dispersion means, suitably arranged, may be utilized to effect multiple dispersions by passing the beams through the same dispersion means several times and measuring the multi-dispersed radiation. The radiation beams which emerge from a single dispersion may be designated as "first pass" radiation while the radiation emerging from two successive dispersions may be conveniently designated as "second pass" radiation and will be referred to as such throughout this disclosure. In the operation of such systems, however, some first pass radiation, in addition to second pass radiation, may unavoidably fall upon the radiation-responsive device in the system. Since radiation detectors are ordinarily incapable of distinguishing between different portions of the same spectra, the first pass radiation which is so detected constitutes a source of error in the useable output.

Some prior art double beam comparison systems such as that disclosed by Walsh in U. S. Patent No. 2,652,742, have employed what has become known as a coding shutter to impress a selected frequency characteristic only upon second pass radiation to render such second pass radiation readily distinguishable. A further extension of this technique includes switching or alternating the two beams to be compared at yet another frequency and detecting the desired output signal contained in a sum or difference frequency resulting from the first two frequencies.

Other prior art systems such as that disclosed in the co-pending application S. N. 436,388 of Coates et al. have utilized arrangements where two of the three frequencies mentioned above were equal. Still other prior art systems have utilized three different frequencies for the switching, coding and detecting operations but at the sacrifice of the enhanced signal-to-noise ratio of useable output signal which may be obtained with a system operating in accordance with the present invention.

Assuming for purposes of illustration, a comparison system wherein both beams are intermittently directed along a common path and the most favorable detection frequency is "$f$," a particular embodiment of the present invention contemplates switching the two beams at a frequency "$3f$" where alternations from one beam to the other are for equal periods of time. After the first pass dispersion, for instance, the beams may be further characterized by chopping or blocking the common path of the beams during every third aforementioned equal switching period. After appropriate detection by radiation-responsive means, the signals of all frequencies except "$f$" may be readily rejected.

The present invention thus affords a means and method by which radiation signals which have a repetitive or cyclic characteristic at any frequency other than the frequency "$f$" may be suppressed as a significant source of error. Moreover, apparatus operating in accordance with the novel switching and coding concept of the present invention produces a useable output at the frequency "$f$" which has an optimal signal-to-noise ratio. A number of variant systems may be made to operate in accordance with the present invention by choosing frequencies for the successive switching and coding operations which are properly related in accordance with the teachings of the present invention both as to ratio and time-displacement so as to effect the significantly improved results previously mentioned.

The present invention may be better understood from the explanation of the operation of several specific embodiments which include variations and modifications of the typical embodiment alluded to hereinbefore for illustrative purposes. The same basic concept and principles of the invention will be found in all the embodiments, however. In the drawings, Fig. 1 is a schematic diagram of a double beam, double pass radiation comparison system embodying the present invention.

Fig. 2 is a series of waveforms illustrating the characteristics of typical radiation and electrical signals which may be developed and employed in an embodiment of the present invention such as that shown in Fig. 1.

Fig. 3 is a series of waveforms illustrating the characteristics of typical radiation and electrical signals developed and employed in another embodiment of the present invention.

Fig. 4 is a series of waveforms illustrating typical radiation and electrical signals developed in still another embodiment of the present invention.

The apparatus schematically illustrated in Fig. 1 is a double beam, double pass radiation comparison system and the instrument is designed so that one of its beams is established as a reference beam while the other of its beams is a sample beam which has some of its radiation energy absorbed by the substance under investigation. By developing a signal which is a measure of the difference of intensity between the reference beam and the sample beam and utilizing that difference signal to actuate means for attenuating the stronger of the two beams until the two beams are of equal intensity, the amount of attenuation as determined from the position and geometrical character of the beam-attenuation device is a function of the percentage of absorption of radiation energy by the substance under investigation in the sample beam.

The embodiment of Fig. 1 uses a single source of radiation such as that shown at S and, through the use of two pairs of converging mirrors 10 and 11, and 12 and 13, the radiation is directed in two separate beams which may be designated RB for the reference beam and SB for the sample beam. The sample beam SB is passed through a sample cell 21 which contains an unknown substance. The reference beam RB, it will be noted, is passed through a reference cell 14 which may be used as a compensating device to duplicate as nearly as possible the radiation absorption of the sample cell structure itself and thereby provide a reliable base reference. Accordingly, a single source of radiation supplies two beams, one of which is passed through a reference cell while the other is passed through a sample cell. These beams initially are of like radiation and variations in the initial character of radiation are substantially consistent in both beams because they are derived from the same source.

After passing through the reference cell 14, the reference beam RB is reflected by mirror 15 to mirror 16 which redirects it in turn to a converging mirror 17. In similar fashion, the sample beam SB passes through the sample cell 21, and a mirror 22 directs it to switching mirror 20 which redirects it in turn to mirror 17. It will be observed that both beams are directed to mirror 17 and follow a single path throughout the remainder of the system. This common path must, therefore, be time-shared by both radiation beams and suitable time-sharing may be effected by a device which will alternately switch each of the beams so that only one is passed through the remainder of the system at any given time. This operation is accomplished in the embodiment of Fig. 1 by the use of switching means 20 driven by a motor 20a. The particular configuration of the switching means 20 may vary in different embodiments of the invention. It is, however, sufficient at this point for an understanding of the operation of this embodiment to appreciate that the switching means 20 is driven by motor 20a so as to alternately allow passage of reference beam RB to mirror 17 and then interrupt reference beam RB while reflecting sample beam SB to the mirror 17. Mirror 17 therefore receives an intermittent reference beam RB and an intermittent sample beam SB which alternate at a frequency dependent upon the rotational speed of switching means 20.

Assuming one of several possible modes of operation of the present invention in a typical embodiment, the switching means 20 may comprise a semi-circular disc having a reflective surface, and the time-sharing alternation of the reference beam RB and the sample beam SB will produce at mirror 17 a composite radiation intensity variation such as that illustrated by waveform A of Fig. 2 wherein radiation intensity is shown as plotted against time. "$I_o$" indicates the amplitude of the radiation intensity of the reference beam RB while "I" indicates the amplitude of the radiation intensity of the sample beam SB. The relative amplitude of the square wave is therefore proportional to the difference between the intensities of the two beams of radiation. Waveform A is typical of the composite radiation beam signals directed on an optical path which is common for both beams of radiation throughout the remainder of the radiation comparison system. If the most desirable detection frequency is established at "$f$," the switching operation is accomplished at "$3f$" in this particular embodiment, having a cyclic period $t_3$ as indicated in Fig. 2.

The beams passing through entrance slit 19 strike a mirror 23 and are directed to a dispersing prism 24. The radiation beams emerging from dispersing prism 24 are reflected from a mirror 25 back to and through the dispersing element 24 where they are dispersed a second time after which they are reconverged by mirror 23. As is well known in the spectroscopic art, a radiation beam may be made to undergo multiple dispersing and reconverging operations so as to further enhance the resolution and accuracy of the system. This is done in the present invention and is accomplished by directing the first pass radiation to mirror 26 which in turn directs the radiation beams to a corner mirror comprised of two elements 27 and 28 which return the radiation to mirror 26. The first pass radiation reflected by mirror 26 is directed to mirror 23 where it is reconverged and redirected to the dispersing prism 24. The radiation then undergoes a second complete dispersion operation much the same as the first dispersion operation previously described. The radiation undergoing two dispersing and reconverging operations and passed through exit slit 30 has been previously designated as second pass radiation to distinguish it from the radiations of other wavelengths which have been dispersed and reconverged but once and may unavoidably pass through slit 30.

A chopping disc 39 actuated by a motor 39a periodically blocks the common path of the first pass radiation between mirrors 27 and 28 before it is returned to the dispersion means and becomes second pass radiation. The frequency and time-displacement of the blocking operation of chopping disc 39 as related to the other cyclic operations of the system are illustrated by waveform B of Fig. 2. The blocking operation is an "on-off" interruption of the beams having a frequency of $2f$ and a cyclic period of $t_2$ as indicated in waveform B of Fig. 2. It will be noted that to effect a blocking operation such as that exemplified by waveform B of Fig. 2, the configuration of the chopping disc should be such that will interrupt the composite radiation signals of waveform A for two-thirds or 240° of each cyclic blocking period, $t_2$.

The compounded action of switching mirror 20 and chopping disc 39 upon the beams which become second pass radiation signals will result in a radiation intensity signal which varies substantially as the waveform C of Fig. 3. The second pass radiation signals therefore contain a component at the frequency "$f$," the magnitude of which will be proportional to the difference in intensity between the selected spectral components of the sample beam and of the reference beam. The first pass radiation signals contain no components of the frequency "$f$" so that a measurement of the radiation signals emerging from exit slit 30 which is selective as to signals characterized by the frequency "$f$" will not be affected by the first pass radiation nor by spurious signals originating from the action of chopping disc 39 which will be characterized by the frequency "$2f$." The frequency "$f$" has a cyclic period $t_1$ as illustrated in waveform C of Fig. 2.

It will be apparent to those skilled in the art that the novel phase and timing relationships of the beam-switching operation and the chopping operation may be achieved in a number of different ways. For instance, the switching mirror 20 may take the form of a disc, half mirrored and half non-reflective, appropriately positioned in the optical path between elements 16 and 17 of Fig. 1, in which case one beam-switching cycle will be achieved with each revolution of the drive motor 20a. Obviously, the switching mirror 20 may comprise any greater number of equal reflective and non-reflective sectors and each pair of such sectors, when rotated in the optical path as shown in Fig. 1, will complete one beam-switching cycle.

The sectors of the chopper 39 by contrast are not equal but have a 2 to 1 ratio. That is to say that the radiation signal passing from mirror 29 to mirror 28 is blocked one third of each blocking cycle and allowed to pass for the remainder of each cycle, or the radiation is conversely blocked for two-thirds of each such cycle and allowed to pass for the remainder of each cycle.

It will be apparent that motors 20a and 39a driving the beam-switching and chopping elements 20 and 39, respectively, may operate at the same speeds or synchronosuly though at different speeds. The particular configurations of elements 20 and 39 and the rotational rates of their drive motors 20a and 39a are inextricably interdependent, and the concept of the present invention requires that these operations be accomplished in the timed and phased relationships illustrated by the waveforms of the drawings. The type of elements and means for achieving such beam-switching and radiation chopping are old and well-known in the art, and many varied combinations of rotational speeds and segmented partially reflective elements may be readily devised by one skilled in the art who has been taugh the critical frequency and phase relationships of the present invention.

In an equivalent arrangement, proper synchronization of the switching and chopping operations may be obtained by employing a single motor suitably equipped with gear trains mechanically linking the switching mirror 20 and the chopping disc 39. Similarly, the beam-switching, rather than the chopping, may have a 2 to 1 operative ratio within each cycle as will be explained more fully in connection with the description of the operation of other embodiments of the present invention.

The radiation emerging from exit slit 30 is reflected by mirror 31 and directed to mirror 32a, whence it is collected and concentrated upon a radiation detector 32. Detector 32 responds to the radiation impinging thereon so as to produce an electrical signal commensurate with energy intensity. Depending upon the type of radiation utilized in the system, a number of different types of detectors may be employed. In one particular embodiment a thermocouple is used to produce an electrical signal which is a measure of the radiation intensity impinging thereon. It will be evident to those skilled in the art, however, that the practice of the present invention is not limited to one particular type of radiation-responsive device.

The signal produced by detector 32 is usually rather weak and an appropriate amplifier 33 is therefore employed to amplify the signal produced by radiation detector 32 to a practically useable level. Suitable filtering means may be incorporated in the amplifier to selectively amplify the signals of the frequency "f" while suppressing higher harmonics of the same frequency. The amplified signal is fed to a demodulator 34 which receives a second input signal at the frequency "f" at its terminal 34a. The demodulator 34 may be, for instance, a gated diode bridge adapted to be cyclically responsive at the frequency "f" and in timed relation to the other periodic operations of the system as illustrated by waveform D of Fig. 2. The demodulator 34 produces an output, a typical example of which is illustrated by waveform E of Fig. 2. This waveform has a direct current component which is a measure of the difference between the radiation intensity of the two beams being compared. The polarity of the direct current component of the output of the demodulator is indicative of which of the two beams is stronger than the other.

This latter signal, after suitable amplification, may be used to drive a servomotor 36 which, in turn, actuates a beam attenuator 37 so as to reduce the intensity difference between the second pass sample and reference beams which reach the radiation detector 32. The relative position of attenuating device 37 is therefore a measure of the ratio of intensity of the radiation passed by the sample cell as compared to the radiation passed by the reference cell. By arranging a recorder 38 to record the position of beam attenuator 37, the variation of the percentage absorption of the sample substance with respect to a number of parameters such as time or wavelength, for instance, may be permanently preserved.

It should be realized that in an actual system the finite size of the beams which are switched and chopped does not permit instantaneous switching and chopping and slight departures from this idealized operation will cause the signals developed in the system to have sloping instead of vertical sides as shown in the square waveforms of the several drawings. In actual working systems, the simultaneity between some of the switching and chopping operations depicted by the waveforms of Fig. 2 will be subject to slight compromises owing, for instance, to minor but unavoidable imperfections in the synchronous control of the motors or the gear trains which are employed to effect such synchronous operations. These very slight departures from ideal conditions will result in a diminution of the signal-to-noise ratio by a very small amount as compared to that which might be obtained under theoretically perfect conditions. The same general remarks apply to the switching and chopping operations shown in Figs. 3 and 4 which imply synchronization of switching mirror 20 and chopping disc 39 and will be readily appreciated by one skilled in the art.

The waveforms of Fig. 3 characterize the operation of an embodiment of the present invention which is similar to that exemplified by the waveforms shown in Fig. 2, but it will be noted that the blocking operation as shown by waveform B is accomplished by blocking the second pass radiation for every third switching period. The switching and blocking operations, therefore, produce a radiation intensity variation which has the configuration of waveform C and a demodulator which is synchronously operative as exemplified by waveform D produces an output such as that illustrated by waveform E. This latter waveform has a direct current component indicative of the difference of intensity of the two beams to be compared. It can be readily verified that for an equal difference of intensity between the reference and sample beam the amplitude of the component of the frequency "f" of waveform C is the same in each of the Figures 2 and 3.

The waveforms of Fig. 4 illustrate yet another embodiment of the present invention in which the switching action alternately passes the two beams through the common portion of the system for different periods of time which have a ratio of two to one. This action is illustrated by the waveform A of Fig. 4. The subsequent coding or blocking operation is performed for equal on and off periods. The frequency of this blocking operation is such that each of the periods is equal to the lesser of the two unequal switching periods illustrated by waveform A. These successive operations produce a composite radiation signal having a configuration substantially that of waveform C of Fig. 5 and a demodulator synchronously operative as shown by waveform D produces an output signal which has the character substantially that of waveform E of Fig. 4. Waveform E, it will be seen, has a direct current component which is a measure of the difference of intensity between the two beams being compared.

It may be readily verified by a simple Fourier integration that the signal developed by the successive operations having frequency relationships in accordance with the present invention has a harmonic component of the frequency "f" of an amplitude equal to $$\frac{2}{\pi}(I_o - I)$$

which is a substantially greater amplitude than that attainable in several other known systems where comparable rejection and suppression of spurious stray radiations is achieved. The substitution of frequencies other than those employed in the present invention and analogous Fourier integrations carried out in the same manner will demonstrate the lesser amplitude of useable output signals which result therefrom.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A radiation comparison system comprising means for generating two beams of radiation, means for alternately directing said beams on a common path, means for periodically blocking said common path, one of said two last-named means being operative at the frequency "$3f$" for equal cyclic alternations and the other of said means being operative at the frequency "$2f$," but for unequal cyclic alternations having a ratio of two to one, radiation-sensitive means positioned to receive said beams for producing a signal as a function of the instantaneous intensity thereof, and a demodulator arranged to receive said radiation intensity signal and adapted to produce a signal commensurate with the "$f$" frequency component of its input, whereby the output of said demodulator is an optimal measure of the difference between the radiation intensity of said two beams.

2. A radiation comparison system comprising means for generating two beams of radiation, means for alternately directing said beams on a common path for periods of equal duration at a frequency "$3f$," means for dispersing said beams more than once, means for cyclically blocking said common path during every third said equal period, radiation-sensitive means positioned to receive said beams for producing a signal as a function of the instantaneous intensity thereof, and a demodulator arranged to receive said radiation intensity signal and adapted to produce a signal commensurate with the "$f$" frequency component of its input, whereby the output of said demodulator is an optimal measure of the difference between the radiation intensity of said two beams.

3. A radiation comparison system comprising means for generating two beams of radiation, means for alternately directing said beams on a common path for periods of equal duration at a frequency "$3f$," means for dispersing said beams more than once, means for cyclically blocking said common path for two of every three successive said equal periods, radiation-sensitive means positioned to receive said beams for producing a signal as a function of the instantaneous intensity thereof, and a demodulator arranged to receive said radiation intensity signal and adapted to produce a signal commensurate with the "$f$" frequency component of its input, whereby the output of said demodulator is an optimal measure of the difference between the radiation intensity of said two beams.

4. A radiation comparison system comprising means for generating two beams of radiation, means for alternately directing said beams on a common path at a frequency of "$2f$" but for unequal periods of time having a ratio of two to one, means for dispersing said beams more than once, means for cyclically blocking said common path at a frequency "$3f$" and for a period equal to the lesser of said two unequal periods, radiation-sensitive means positioned to receive said beams for producing a signal as a function of the instantaneous intensity thereof, and a demodulator arranged to receive said radiation intensity signal and adapted to produce a signal commensurate with the "$f$" frequency component of its input, whereby the output of said demodulator is an optimal measure of the difference between the radiation intensity of said two beams.

5. The method of producing a signal of optimal signal-to-noise ratio in a two-beam radiation comparison system which comprises switching said two beams to a common path for alternate equal periods at a frequency "$3f$," blocking said common path during every third said period, and detecting the "$f$" frequency component of the resultant radiation signals.

6. The method of producing a signal of optimal signal-to-noise ratio in a two-beam radiation comparison system which comprises alternately switching said two beams to a common path at a frequency "$2f$" but for unequal periods of time having a ratio of two to one, blocking said common path at a frequency "$3f$" and for a period equal to the lesser of said two unequal periods, and detecting the "$f$" frequency component of the resultant radiation signals.

7. The method of producing a signal of optimal signal-to-noise ratio in a two-beam radiation comparison system which comprises switching said two beams to a common path for alternate equal periods at a frequency "$3f$," blocking said common path during two of every three successive periods, and detecting the "$f$" frequency component of the resultant radiation signals.

References Cited in the file of this patent

UNITED STATES PATENTS

| 2,525,445 | Canada | Oct. 10, 1950 |
| 2,547,212 | Jamison | Apr. 3, 1951 |
| 2,604,810 | Backhouse | July 29, 1952 |
| 2,652,742 | Walsh | Sept. 22, 1953 |
| 2,679,010 | Luft | May 18, 1954 |
| 2,680,989 | Savitzky et al. | June 15, 1954 |

FOREIGN PATENTS

| 873,671 | France | Mar. 30, 1942 |

OTHER REFERENCES

Article by J. U. White and M. D. Liston on, "Construction of a Double Beam Recording Infra Red Spectrophotometer," in the Journal of the Optical Society of America, vol. 40, No. 1, January 1950; pp. 29–40.